A. CALLESON.
RIM TOOL.
APPLICATION FILED FEB. 9, 1915.

1,140,023.

Patented May 18, 1915.

Witnesses:
Harry J. Fleischer
F. George Barry

Inventor
Amre Calleson
by attorneys

UNITED STATES PATENT OFFICE.

AMOS CALLESON, OF NEW YORK, N. Y.

RIM-TOOL.

1,140,023.

Specification of Letters Patent.

Patented May 18, 1915.

Application filed February 9, 1915. Serial No. 7,152.

*To all whom it may concern:*

Be it known that I, AMOS CALLESON, a citizen of the United States, and resident of the borough of Brooklyn, in the city and State of New York, have invented a new and useful Improvement in Rim-Tools, of which the following is a specification.

My invention relates to rim tools with the object in view of providing a device of this character which will be very simple in construction, positive in action and which will effectively contract and expand the transversely divided demountable rims for pneumatic tires for facilitating the removal and replacement of the tires.

My invention consists in a rim tool of the above character in which the rods of the turn buckle are so connected to the rim clamping members that the transversely divided rim may be positively contracted and expanded, the said rim clamping members being so formed that they have an extended engagement with the sides of the rim and are substantially rigid to insure a positive gripping action on the rim.

Practical embodiments of my invention are represented in the accompanying drawings, in which—

Figure 1:
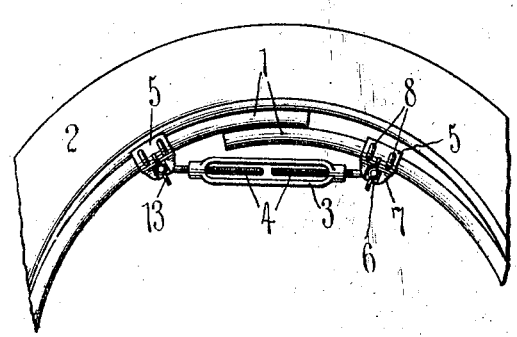
Figure 2:
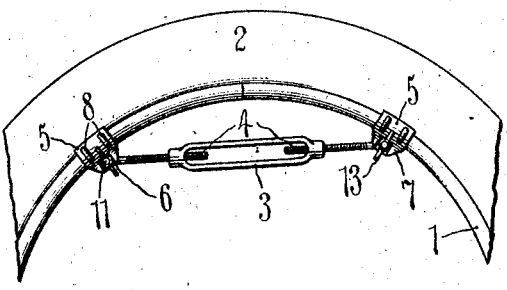
Figure 3:
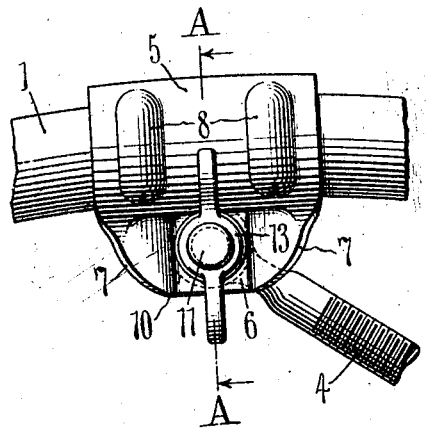
Figure 4:
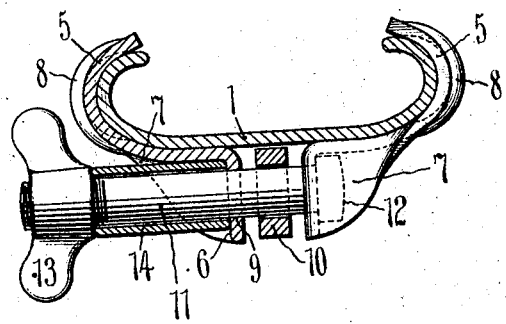
Figure 5:
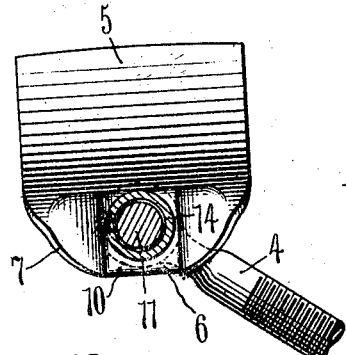
Figure 6:
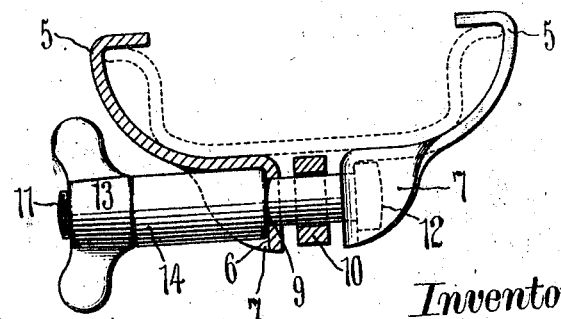

Figure 1 is a detail view showing the application of my improved rim tool, the parts being in the position which they assume when the rim has been contracted to permit the removal or replacement of the tire, Fig. 2 is a similar view with the parts in the position which they assume when the rim has been expanded into position to lock the tire thereon, Fig. 3 is an enlarged detail view in side elevation at one of the pairs of clamping members, Fig. 4 is a transverse section taken in the plane of the line A—A of Fig. 3, one of the rim clamping members being shown in end elevation, Fig. 5 is a view partly in side elevation and partly in section of a tool of slightly modified form at one of the pairs of rim clamping members, and Fig. 6 is a view taken at right angles to Fig. 5, partly in section and partly in end elevation.

The transversely divided demountable rim is denoted by 1 and the tire by 2. The turn-buckle of the rim tool is denoted by 3 and its screw threaded rods by 4. There are two pairs of rim clamping members connected to the outer ends of these turn-buckle rods 4, the members of each pair being similar in form.

Each rim clamping member comprises a longitudinally extended hook portion 5, a seat portion 6 and strengthening ribs 7 connecting the ends of the hook portion 5 with the sides of the seat portion 6, and forming means for preventing the turning of the head of the tightening bolt to be immediately described. Each rim clamping member is also provided with one or more stiffening ribs 8. In the present instance two are shown extending transversely on the exterior of the hook portion 5 of the member.

Each rim clamping member has a hole 9 through its seat portion and the outer ends of the turn-buckle rods 4 are provided with eyes 10 therethrough. The outer ends of these rods are preferably flattened, as shown. A cross bolt 11 passes through the holes 9 in the seat portions 6 of each pair of rim clamping members and also through the eye 10 in the outer end of the corresponding turn-buckle rod 4, which end is interposed between the seat portions 6.

The head 12 of the cross bolt is prevented from turning on its seat by the diagonal ribs 7 as heretofore explained. To bring the thumb nut 13 of the cross bolt into a proper position for manipulating the same, a sleeve 14 is interposed between the thumb nut and the seat portion 6 of its rim clamping member.

In the embodiment shown in Figs. 1 to 4 inclusive, the rim clamping members are shown as adapted to rims of one type and in the form shown in Figs. 5 and 6 the rim clamping members are shown as adapted for use in connection with rims of another type. In this latter form the strengthening ribs 8 are omitted. Otherwise, the tool is substantially the same as that shown in Figs. 1 to 4 inclusive. It is obvious that the rim clamping members may be of any desired form so long as they have an extended bearing upon the sides of the demountable rim.

In operation, the pairs of rim clamping members are engaged with the transversely divided demountable rim upon opposite sides of its division and are clamped in position by the turning of the thumb screws 13. The turn-buckle 3 may then be turned in a direction to slightly spread the rim to permit one end to be forced out of alinement with the other end by any suitable tool. The turn-buckle may then be turned in a direction to contract the rim to permit the removal of the tire and its replacement. After the tire has been replaced, the turn-buckle may be turned in a direction to positively expand the rim until the ends are brought back into alinement. The tool may then be released by the manipulation of the thumb screws 13.

It is evident that slight changes may be resorted to in the form, construction and arrangement of the several parts without departing from the spirit and scope of my invention; hence I do not wish to limit myself strictly to the structure herein set forth, but

What I claim is:

1. A rim tool including a turn-buckle and its rods, two pairs of rim clamping members connected to said rods whereby the rim may be positively contracted and expanded.

2. A rim tool including a turn-buckle and its rods, two pairs of rim clamping members, cross bolts and their thumb nuts serving the double purpose of connecting the clamping members to the rods and for securing the clamping members to the rim.

3. A rim tool including a turn-buckle and its rods, two pairs of rim clamping members, cross bolts connecting the rods and rim clamping members, each cross bolt having its head held against turning in one rim clamping member and a thumb nut for drawing each pair of clamping members into engagement with the rim.

4. A rim tool including a turn-buckle and its rods, two pairs of rim clamping members, cross bolts connecting the rods and rim clamping members, each cross bolt having its head held against turning in one rim clamping member, a thumb nut for drawing each pair of clamping members into engagement with the rim, and a spacing sleeve on said cross bolt between its thumb nut and rim clamping member for properly positioning the thumb nut to permit its manipulation.

5. In a rim tool, a rim engaging member comprising a longitudinally extended hook portion, a seat portion and strengthening ribs connecting the ends of the hook portion with the sides of the seat portion.

6. In a rim tool, a rim engaging member comprising a longitudinally extended hook portion, a seat portion and strengthening ribs connecting the ends of the hook portion with the sides of the seat portion, said hook portion being provided with one or more stiffening ribs.

In testimony, that I claim the foregoing as my invention, I have signed my name in presence of two witnesses, this eighth day of February 1915.

AMOS CALLESON.

Witnesses:
F. GEORGE BARRY,
C. S. SUNDGREN.